United States Patent [19]
Hoshi

[11] Patent Number: 6,052,225
[45] Date of Patent: *Apr. 18, 2000

[54] VARIABLE MAGNIFICATION VIEWFINDER

[75] Inventor: Koji Hoshi, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/604,407

[22] Filed: Feb. 21, 1996

[30] Foreign Application Priority Data

Mar. 2, 1995 [JP] Japan .................................. 7-068828

[51] Int. Cl.⁷ .......................... G03B 13/06; G02B 15/14
[52] U.S. Cl. ......................... 359/432; 359/431; 359/689
[58] Field of Search ........................... 359/362, 420–422, 359/431–433, 676–677, 689, 708, 684–686, 784; 396/373–386

[56] References Cited

U.S. PATENT DOCUMENTS

| | | | |
|---|---|---|---|
| 4,842,395 | 6/1989 | Sato et al. | 359/432 |
| 5,173,806 | 12/1992 | Ogata | 359/683 |
| 5,300,977 | 4/1994 | Lewis et al. | 396/379 |
| 5,323,264 | 6/1994 | Kato | 359/432 |
| 5,410,430 | 4/1995 | Ito et al. | 359/422 |
| 5,504,626 | 4/1996 | Oshikiri | 359/689 |
| 5,555,431 | 9/1996 | Kim | 359/676 |

FOREIGN PATENT DOCUMENTS

| | | |
|---|---|---|
| 61-156018 | 7/1986 | Japan . |
| 64-65519 | 3/1989 | Japan . |
| 1-116616 | 5/1989 | Japan . |
| 4-51108 | 2/1992 | Japan . |
| 4-56184 | 2/1992 | Japan ..................... 359/676 |

*Primary Examiner*—Thong Nguyen
*Attorney, Agent, or Firm*—Fitzpatrick, Cella, Harper & Scinto

[57] ABSTRACT

In a variable magnification viewfinder of real image type in which an object image formed by an objective lens system of positive refractive power is converted into an erecting image by an image inverting optical system and the erecting image is observed through an eyepiece lens system, the objective lens system includes, in order from the object side, a negative first lens unit, a negative second lens unit and a positive third lens unit, and, during variation of magnification from the lowest magnification side to the highest magnification side, both the second lens unit and the third lens unit move toward the object side monotonically, so that a good optical performance throughout the entire range of variation of magnification can be attained.

10 Claims, 12 Drawing Sheets

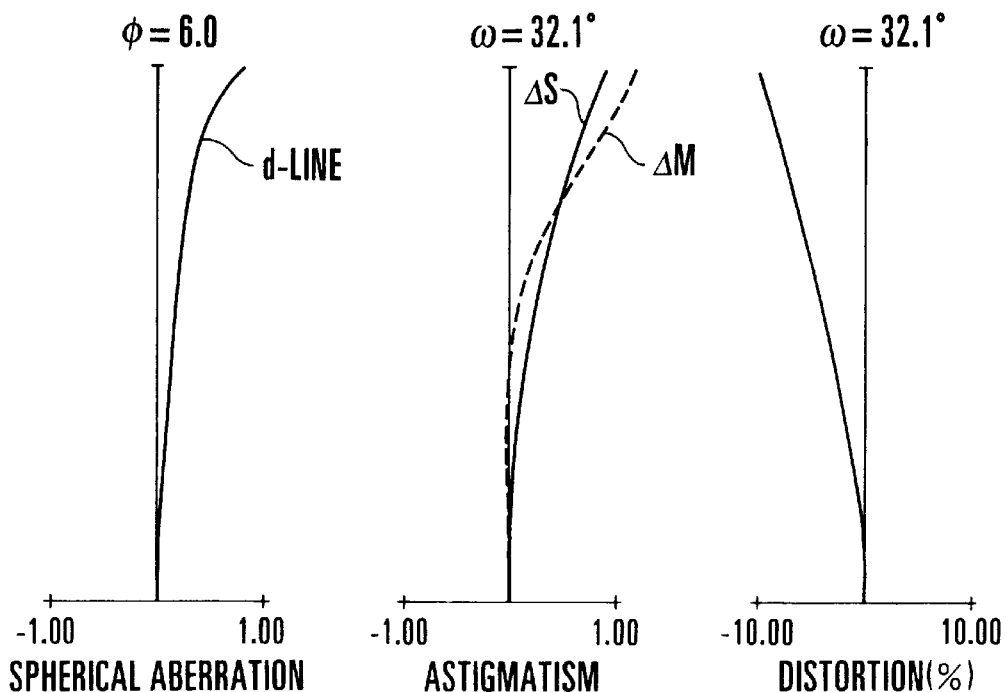
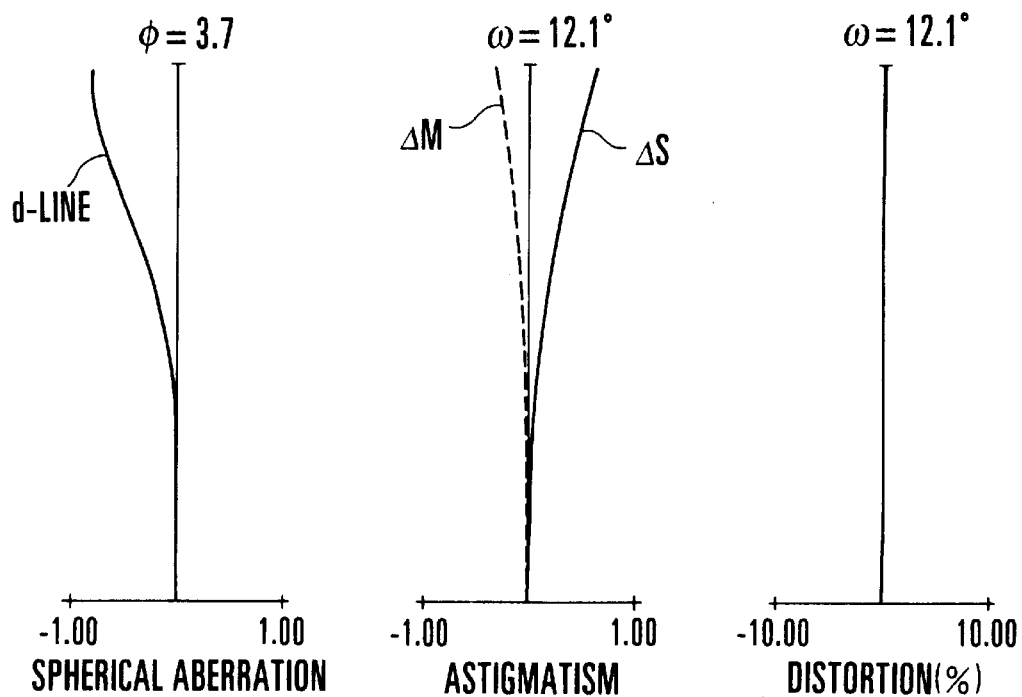

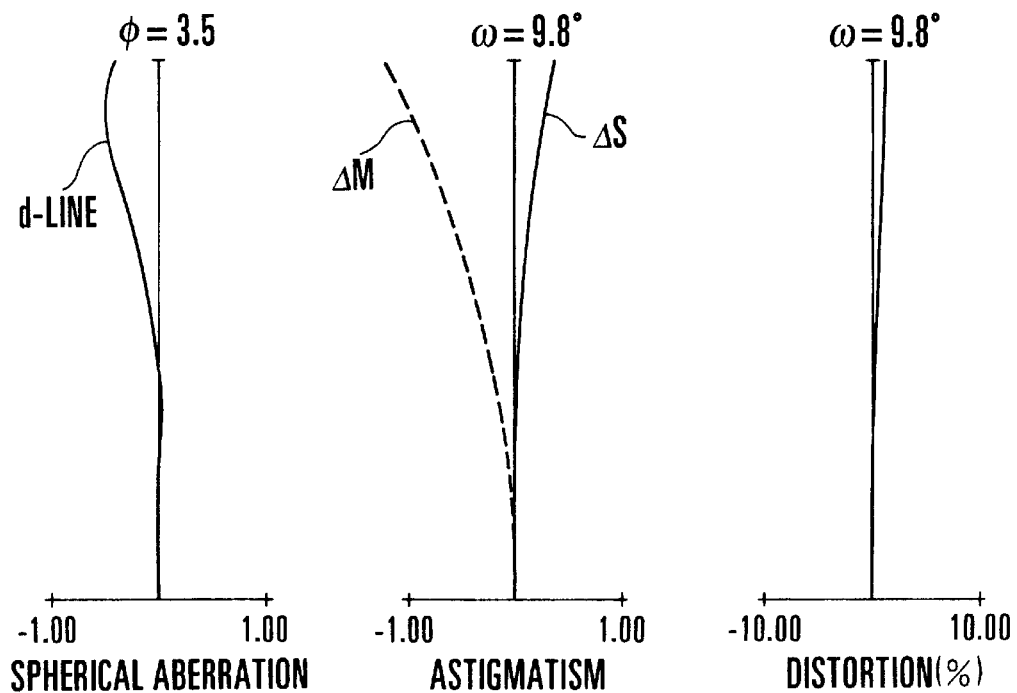
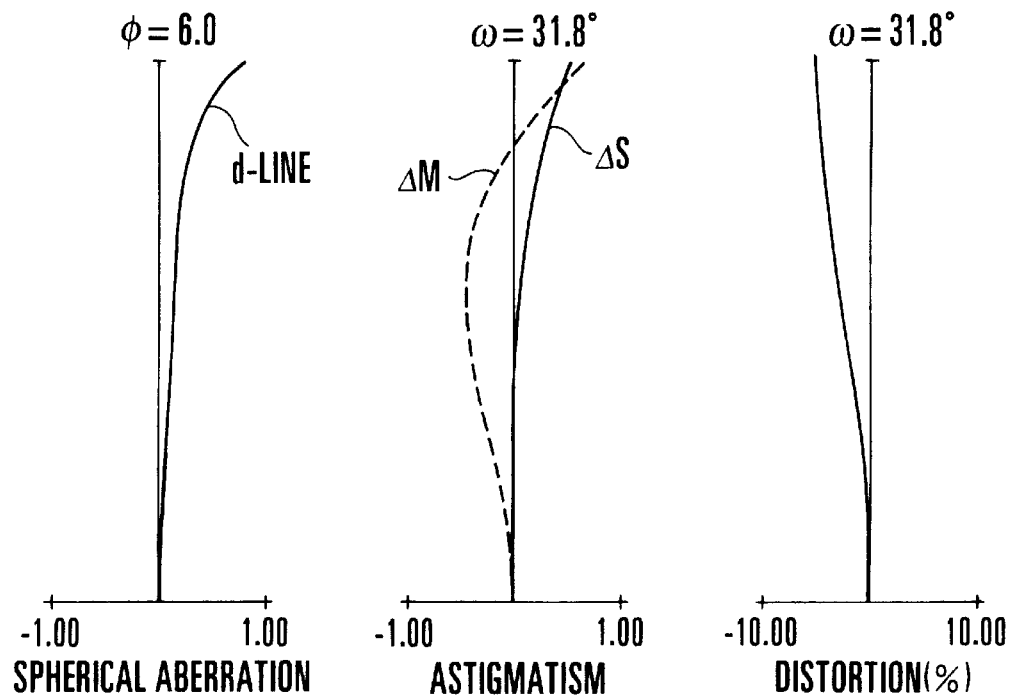

FIG. 11A   FIG. 11B   FIG. 11C
FIG. 12A   FIG. 12B   FIG. 12C
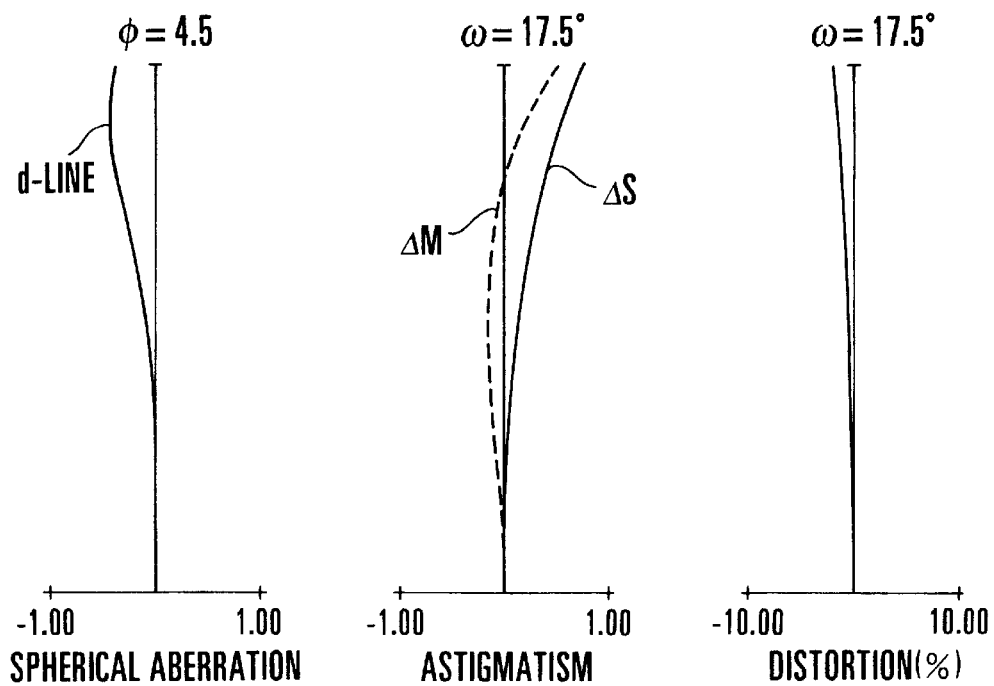
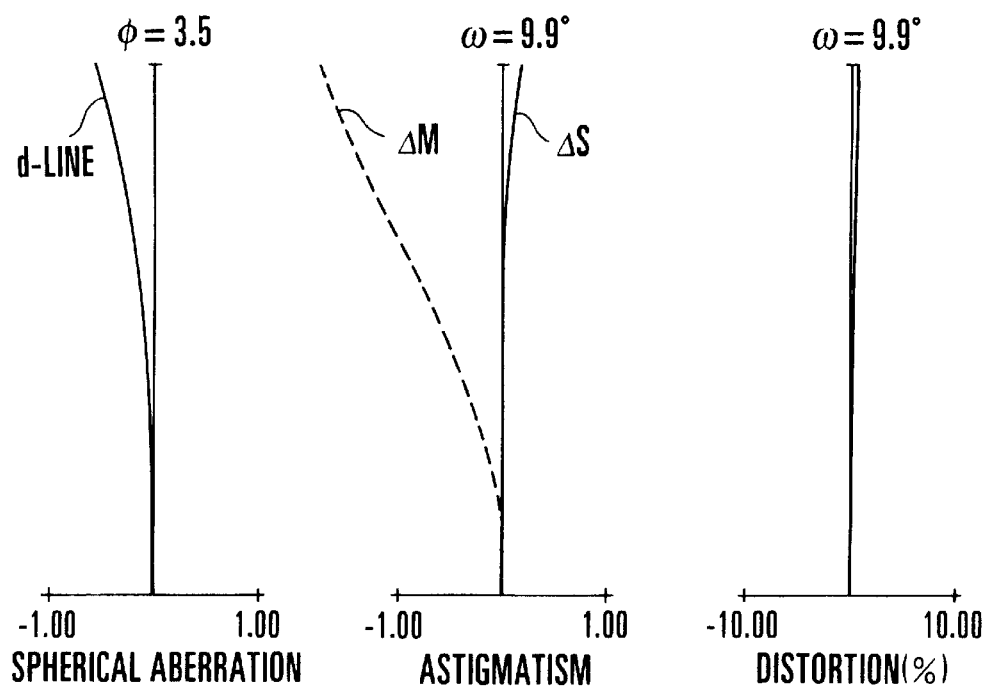

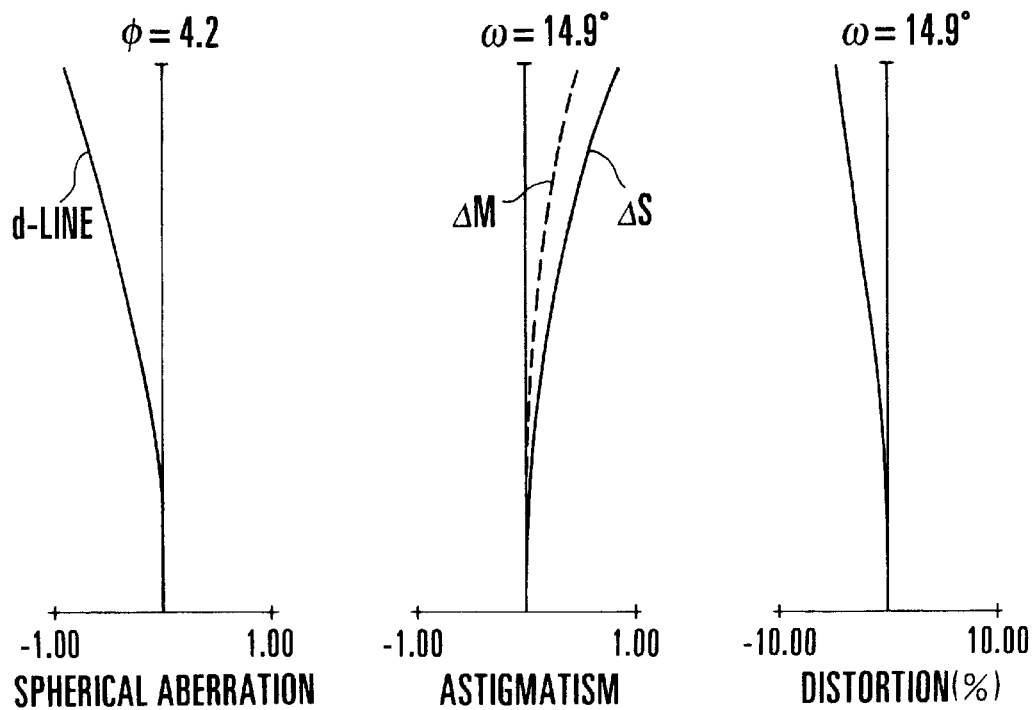
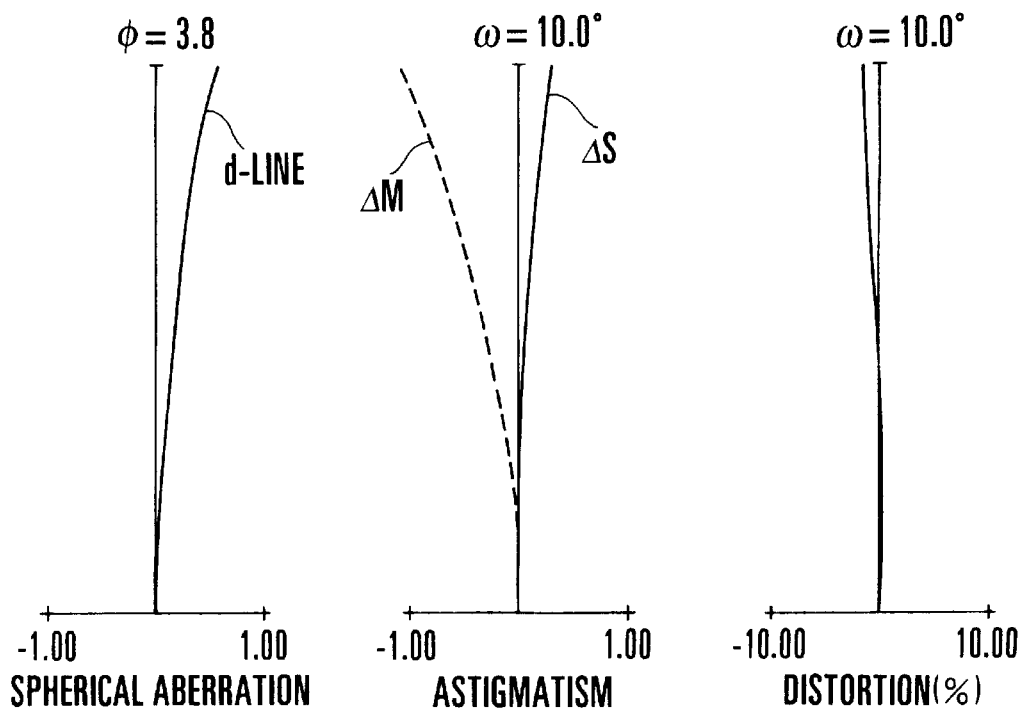

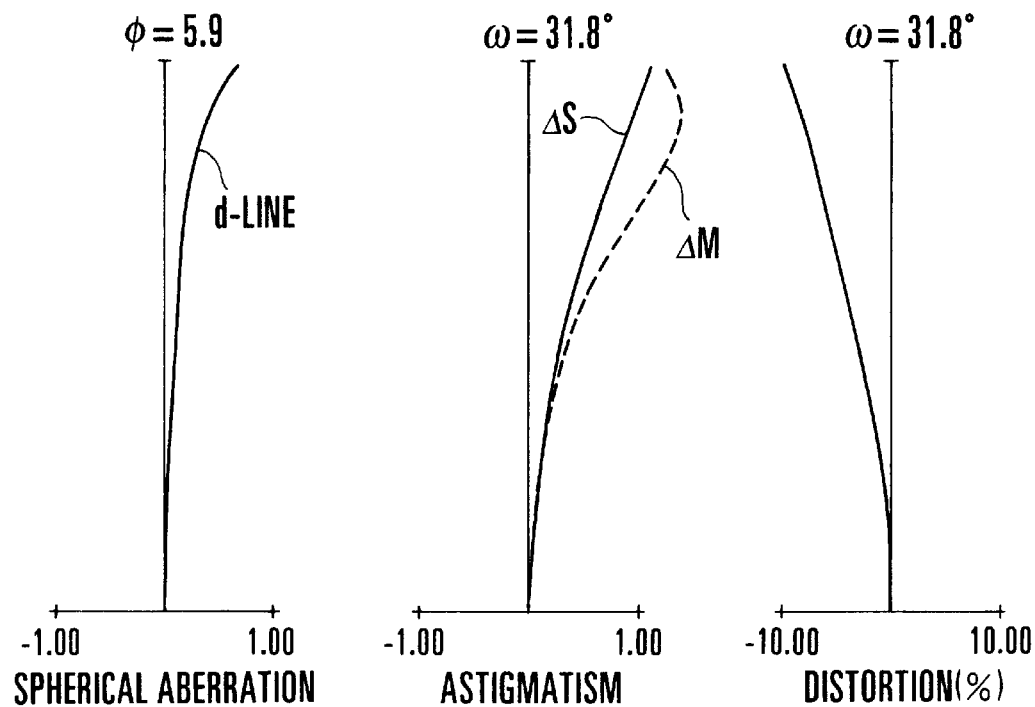
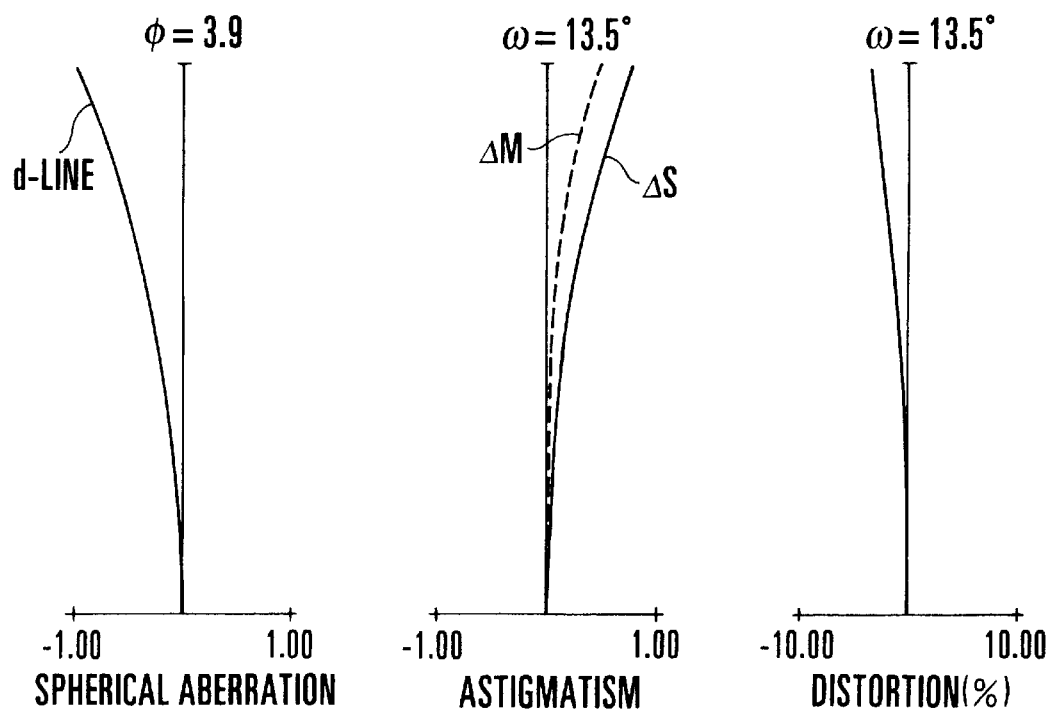

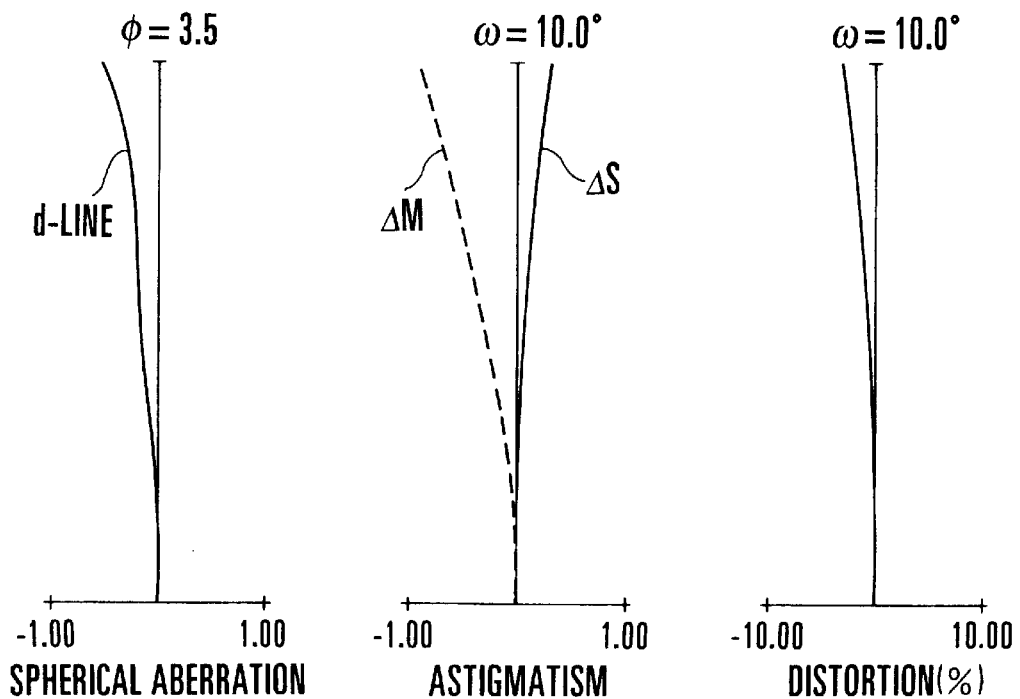
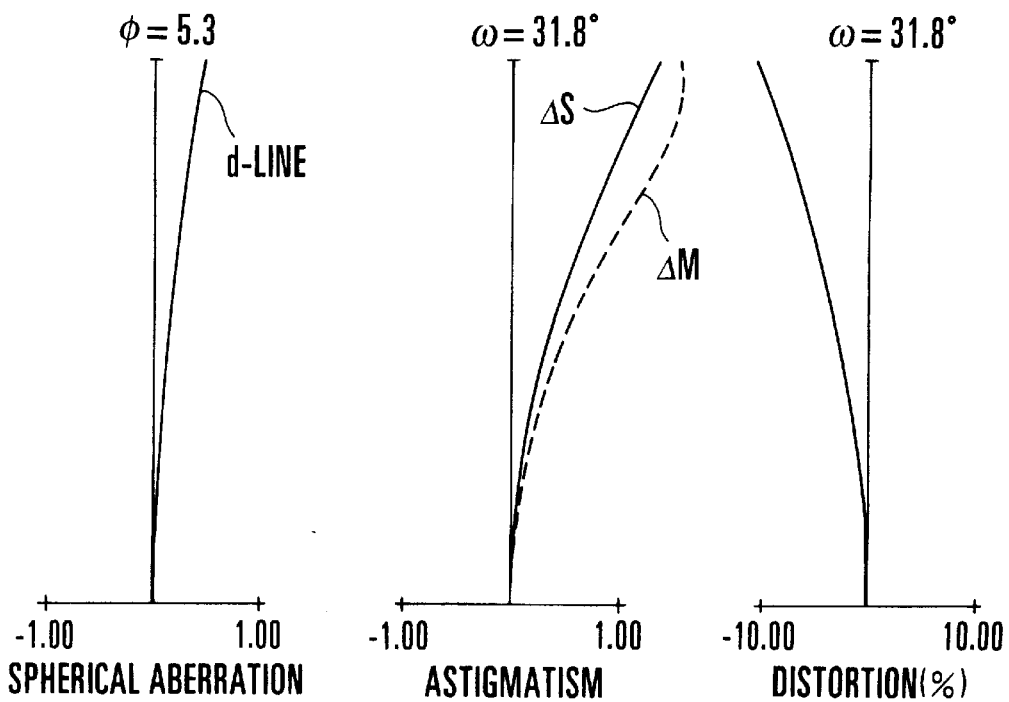

VARIABLE MAGNIFICATION VIEWFINDER

BACKGROUND OF THE INVENTION

1. Field of the Invention

This invention relates to variable magnification viewfinders of real image type and, more particularly, to such variable magnification viewfinders which are used with photographic systems in separation therefrom, as the systems are of external finder type. Still more particularly, this invention relates to an objective lens system constituting part of the variable magnification viewfinder, which is designed by setting forth appropriate rules to improve the viewfinder image at all magnifications, so suited to be used in, for example, still cameras or video cameras.

2. Description of the Related Art

In the camera having a viewfinder system and a photographic system formed separately from each other, it is conventional that, if the photographic system is a variable magnification system, the viewfinder system, too, is configured as a variable magnification system, and is arranged so that the field magnification of the viewfinder system is made to vary according to the variation of magnification of the photographic system. For the variable magnification viewfinder, because of having to be set in the camera, it is required in general that the bulk and size be minimized and, moreover, that the configuration is amenable to the easy technique of obtaining as much zoom ratio as desired.

So-called 2-unit type variable magnification viewfinders have been variously proposed in which an objective lens system is constructed with two lens units of negative and positive refractive powers, respectively. Both of the two lens units axially move to vary the magnification. An object image formed by the objective lens system at each of various magnifications is converted by a Porro-prism into a non-inverted erecting image, which is then observed through an eyepiece lens system.

Also, Japanese Laid-Open Patent Application No. Hei 4-51108 discloses a variable magnification viewfinder whose objective lens system is constructed with three lens units of minus-minus-plus refractive power arrangement in this order from the object side. The magnification is varied by moving the second lens unit toward the object side and the third lens unit toward the image side.

Another variable magnification viewfinder is disclosed in Japanese Laid-Open Patent Application No. Sho 64-65519, in which an objective lens system is constructed with three lens units, of which the first is negative in refractive power, the second is positive and the third is positive. In this case, the first and second lens units are selected to be movable for varying the magnification.

Also, Japanese Laid-Open Patent Applications Nos. Sho 61-156018 and Hei 1-116616 have proposed a real image type of variable magnification viewfinder whose objective lens system is constructed with a multiplicity of lens units. The air separations between any adjacent two of the lens units are made variable for varying the magnification. An object image formed by the objective lens system at each of various magnifications is converted by an image inverting member such as a Porro prism into an erecting image, which is then observed through an eyepiece lens system.

Of the variable magnification viewfinders described above, the 2-unit variable magnification viewfinder, that is, whose objective lens system comprises the negative first and positive second lens units, both lens units moving axially to vary the magnification, has a feature that the second lens unit contributes to variation of the magnification, while the first lens unit compensates for the shift of the image plane. Therefore, the first lens unit has to be used in correcting the eyesight change. Another problem is that good stability of aberration correction against variation of the magnification is difficult to maintain from the point of view of the lens configuration.

In the case of the 2-unit variable magnification viewfinder, if the manufacturing tolerance is to be absorbed by adjusting the eyesight or by adjusting the parallax, some lens units must change their positions in a different way from that when zooming. This leads to another problem that the complexity of structure of the operating mechanism increases greatly. Besides this, if zooming from one end of the range to the other end accompanies reciprocating of a lens unit, the viewfinder image is often caused to sway at the turning point of movement of the lens unit, thereby giving an additional problem.

In general, the variable magnification viewfinders of real image type have a feature that, in order to attain an increase of the zoom ratio to a predetermined value with the limitation of the bulk and size to a minimum, there is need to set forth proper rules of lens design, in particular, for the objective lens system. Taking an example of the variable magnification viewfinder proposed in the above-described Japanese Laid-Open Patent Application No. Sho 64-65519, if the zoom ratio is increased, the amount of movement of the second lens unit would also be increased. Thus, the size of the entire lens system is caused to increase. To assure minimization of the size of the entire lens system, the refractive powers of the first and second lens units may be strengthened. If they are made merely stronger, the aberrations vary to a greater extent with variation of the magnification. Therefore, it becomes difficult to observe the viewfinder image with good quality.

SUMMARY OF THE INVENTION

According to the present invention, proper rules of lens design in a variable magnification viewfinder are set forth for an objective lens system having a section of varying the magnification, so that a predetermined zoom ratio can be easily secured while still permitting minimization of the size of the entire lens system. In addition, it is made possible to observe the viewfinder image with excellent quality over the entire range of variation of the magnification. It is, therefore, an object of the invention to provide a wide-angle, large relative aperture variable magnification viewfinder of real image type.

In accordance with an aspect of the invention, there is provided a variable magnification viewfinder in which an object image formed by an objective lens system of positive refractive power is converted into an erecting image by an image inverting optical system and the erecting image is observed through an eyepiece lens system. In the variable magnification viewfinder, the objective lens system comprises, in order from an object side, a negative first lens unit, a negative second lens unit and a positive third lens unit, wherein, during variation of magnification from a lowest magnification side to a highest magnification side, both the second lens unit and the third lens unit move toward the object side (monotonically).

BRIEF DESCRIPTION OF THE DRAWINGS

FIGS. 7A, 7B and 7C are graphic representations of the aberrations of the numerical example 1 of the invention at the lowest magnification;

FIGS. 8A, 8B and 8C are graphic representations of the aberrations of the numerical example 1 of the invention at an intermediate magnification;

FIGS. 9A, 9B and 9C are graphic representations of the aberrations of the numerical example 1 of the invention at the highest magnification;

FIGS. 10A, 10B and 10C are graphic representations of the aberrations of the numerical example 2 of the invention at the lowest magnification;

FIGS. 11A, 11B and 11C are graphic representations of the aberrations of the numerical example 2 of the invention at an intermediate magnification;

FIGS. 12A, 12B and 12C are graphic representations of the aberrations of the numerical example 2 of the invention at the highest magnification;

FIGS. 17A, 17B and 17C are graphic representations of the aberrations of the numerical example 4 of the invention at an intermediate magnification;

FIGS. 18A, 18B and 18C are graphic representations of the aberrations of the numerical example 4 of the invention at the highest magnification;

FIGS. 19A, 19B and 19C are graphic representations of the aberrations of the numerical example 5 of the invention at the lowest magnification;

FIGS. 20A, 20B and 20C are graphic representations of the aberrations of the numerical example 5 of the invention at an intermediate magnification;

FIGS. 21A, 21B and 21C are graphic representations of the aberrations of the numerical example 5 of the invention at the highest magnification;

FIGS. 22A, 22B and 22C are graphic representations of the aberrations of the numerical example 6 of the invention at the lowest magnification;

In the graphs of the aberrations, "d" stands for the spectral d-line, $\Delta S$ stands for the sagittal image focus, and $\Delta M$ stands for the meridional image focus.

DETAILED DESCRIPTION OF THE PREFERRED EMBODIMENTS

Figure 1A:
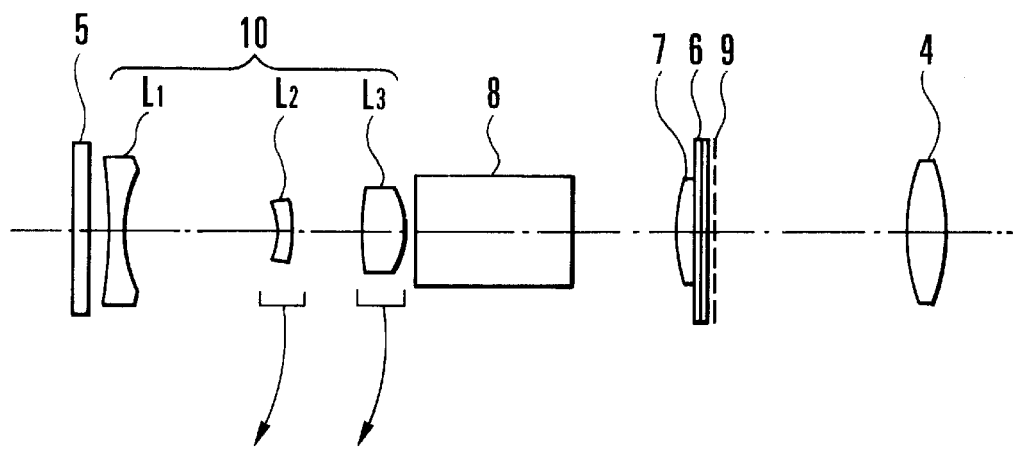
FIGS. 1A, 1B and 1C are lens block diagrams of a numerical example 1 of the invention in different operative positions.
Figure 1B:
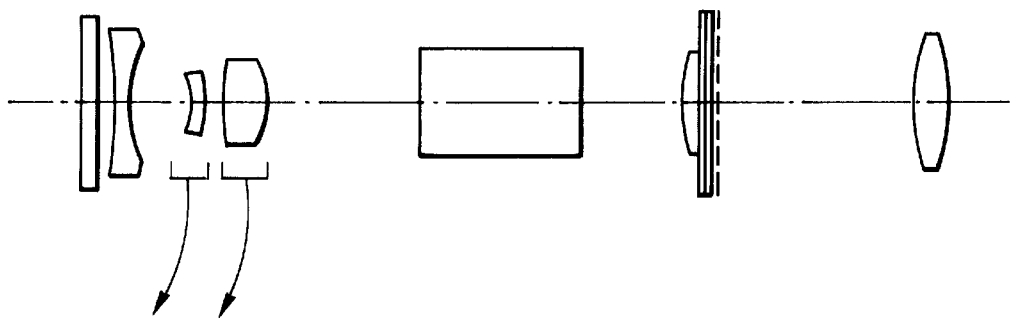
Figure 1C:
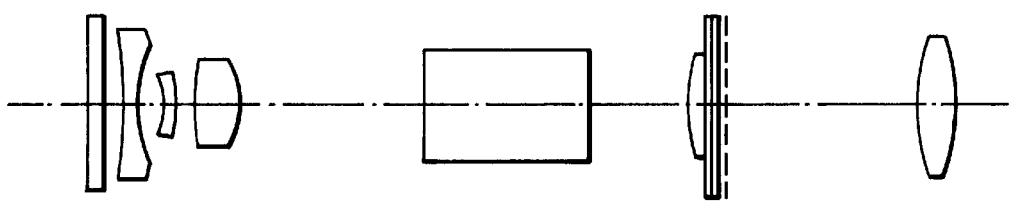
Figure 2:
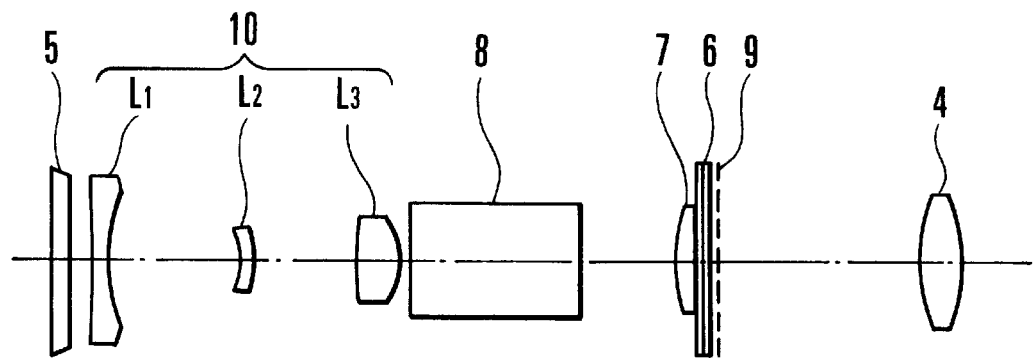
FIG. 2 is a lens block diagram of a numerical example 2 of the invention.
Figure 3:
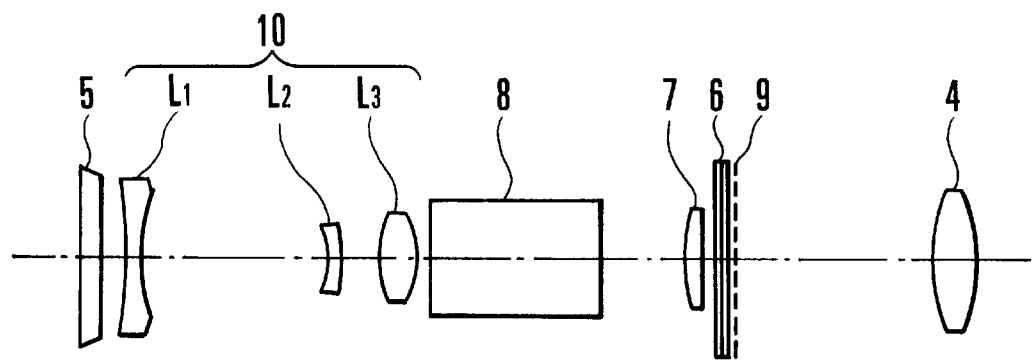
FIG. 3 is a lens block diagram of a numerical example 3 of the invention.
Figure 4:
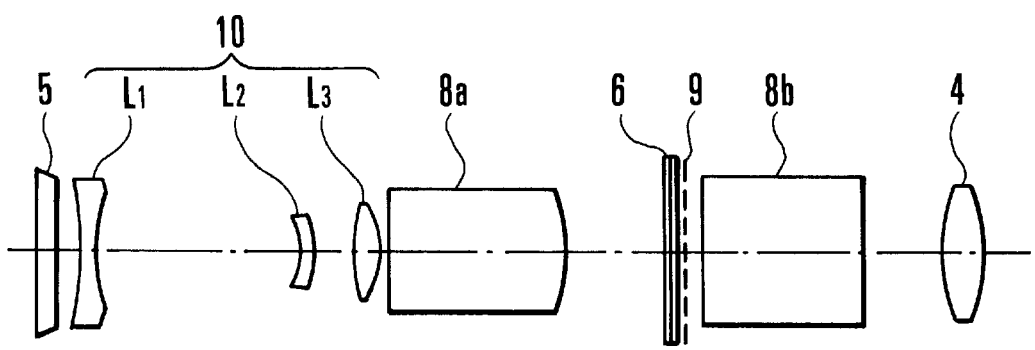
FIG. 4 is a lens block diagram of a numerical example 4 of the invention.
Figure 5:
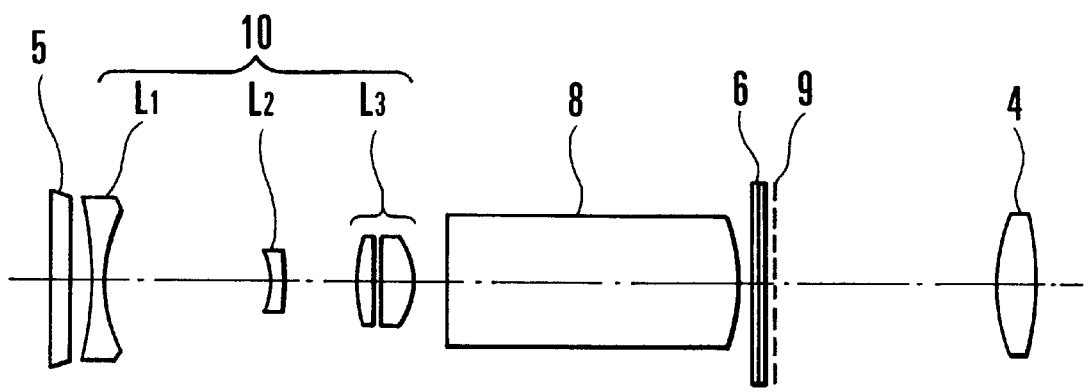
FIG. 5 is a lens block diagram of a numerical example 5 of the invention.
Figure 6:
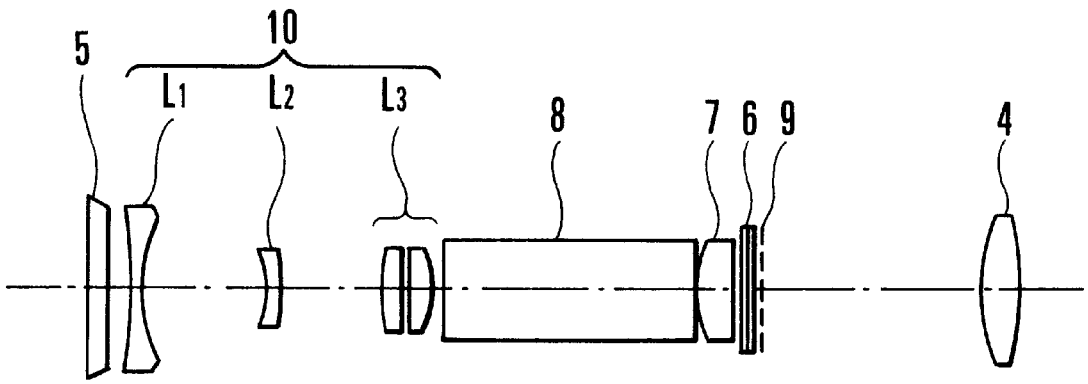
FIG. 6 is a lens block diagram of a numerical example 6 of the invention.
Figures 13A, 13B, 13C:
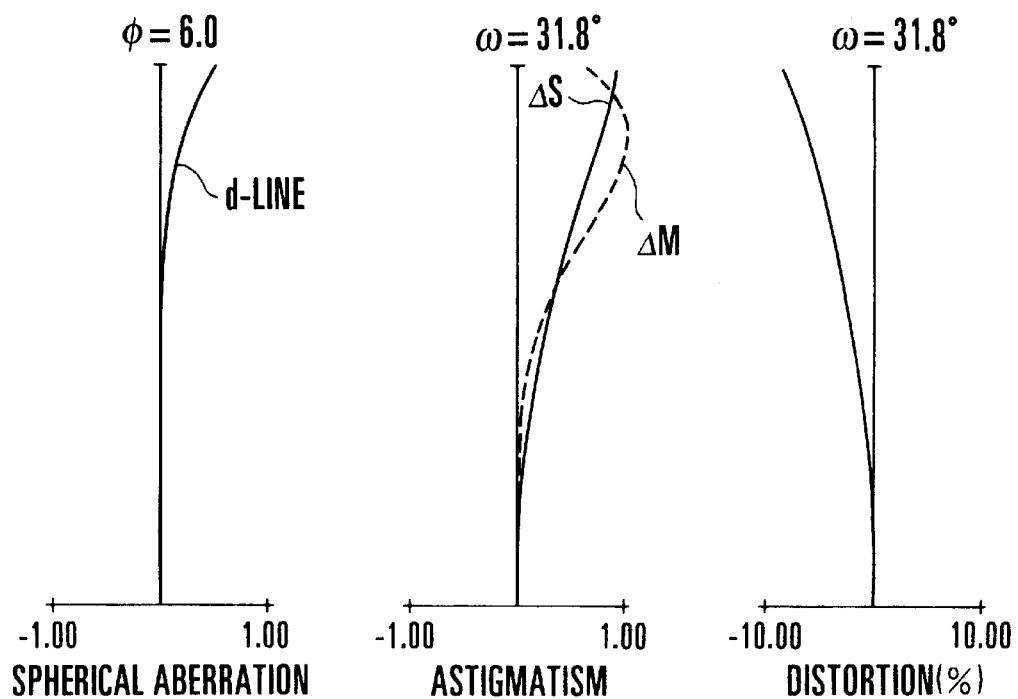
FIGS. 13A, 13B and 13C are graphic representations of the aberrations of the numerical example 3 of the invention at the lowest magnification.
Figures 14A, 14B, 14C:
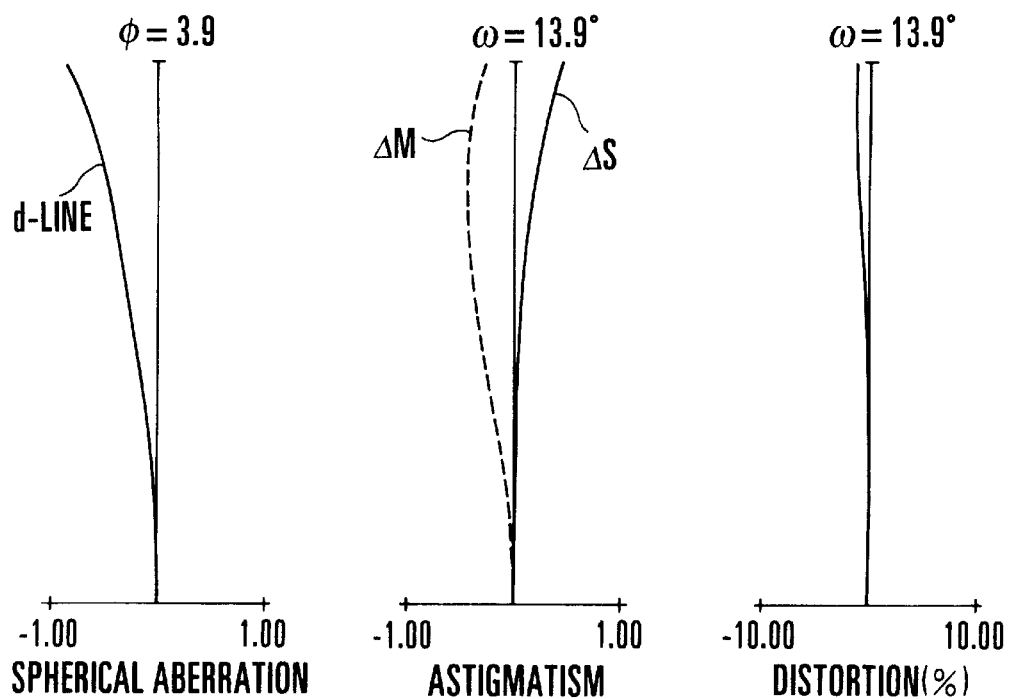
FIGS. 14A, 14B and 14C are graphic representations of the aberrations of the numerical example 3 of the invention at an intermediate magnification.
Figures 15A, 15B, 15C:
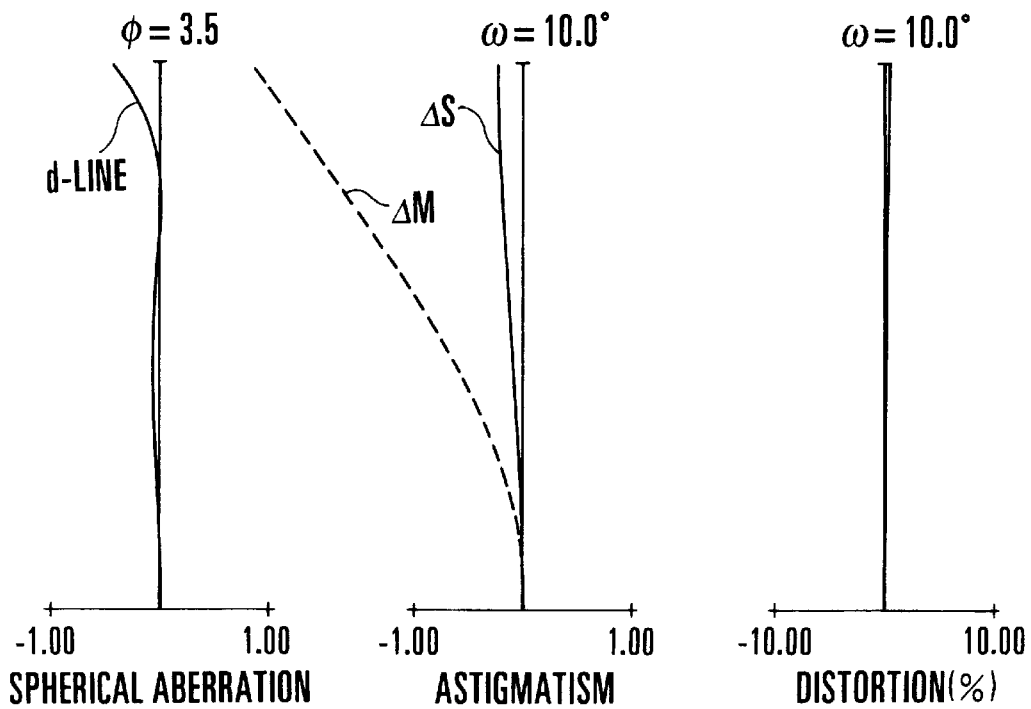
FIGS. 15A, 15B and 15C are graphic representations of the aberrations of the numerical example 3 of the invention at the highest magnification.
Figures 16A, 16B, 16C:
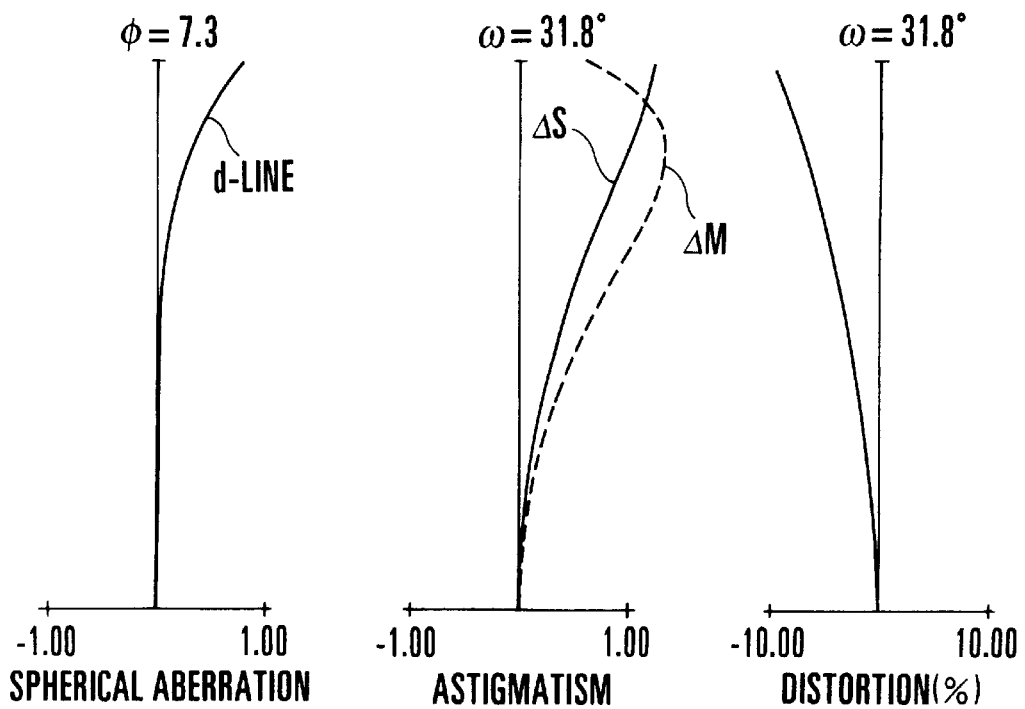
FIGS. 16A, 16B and 16C are graphic representations of the aberrations of the numerical example 4 of the invention at the lowest magnification.
Figures 23A, 23B, 23C:
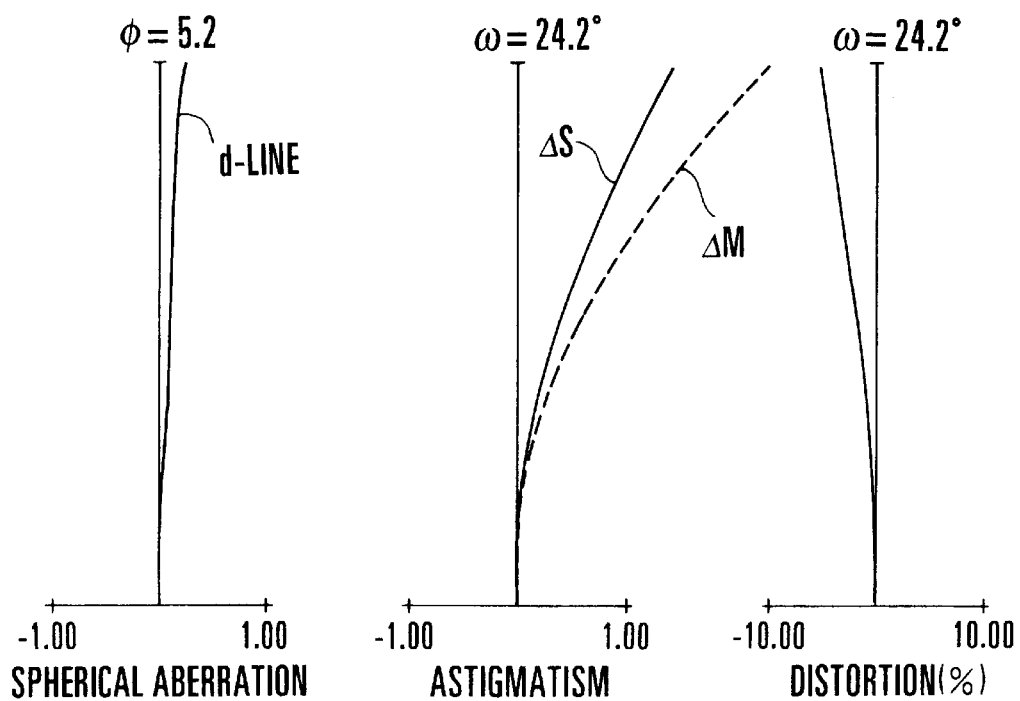
FIGS. 23A, 23B and 23C are graphic representations of the aberrations of the numerical example 6 of the invention at an intermediate magnification.
Figures 24A, 24B, 24C:
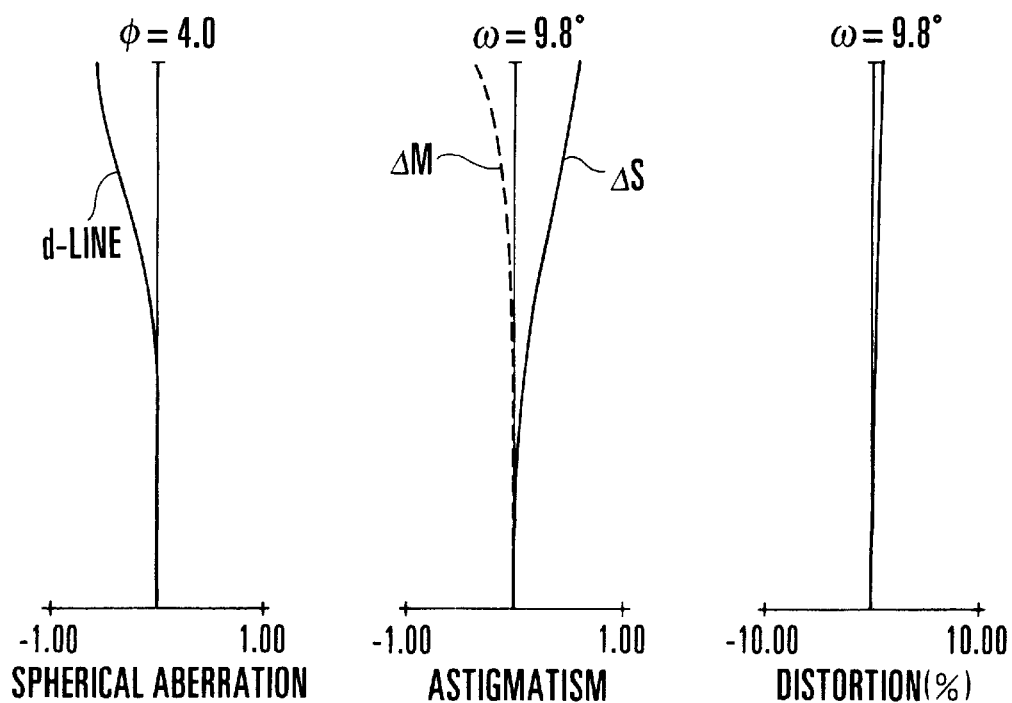
FIGS. 24A, 24B and 24C are graphic representations of the aberrations of the numerical example 6 of the invention at the highest magnification.

FIGS. 1A, 1B and 1C to FIG. 6 in block diagrams show examples 1 to 6 of variable magnification viewfinders of the invention, respectively, of which the numerical data will be described later. FIG. 1A is in an operative position for the lowest magnification (wide-angle end), FIG. 1B for an intermediate magnification (intermediate zooming position) and FIG. 1C for the highest magnification (telephoto end). The aberrations of the numerical examples 1 to 6 are shown in FIGS. 7A, 7B and 7C to FIGS. 24A, 24B and 24C, respectively.

In FIGS. 1A, 1B and 1C to FIG. 6, a transparent protection plate 5 is located in front of an objective lens system 10 of positive refractive power. The objective lens system 10 has a magnification varying section and is arranged to form an object image (or viewfinder image) on a predetermined plane (a first image forming plane 9 to be described later). A prism 8 is an element constituting an image inverting optical system.

The image inverting optical system in the present embodiment has four reflection faces in total, by which the inverted object image formed by the objective lens system 10 is converted into a non-inverted erecting object image. In the drawings, there is shown only one of the parts of the image inverting optical system, i.e., the prism 8, in the form of a glass block obtained by expanding the light path for the purpose of simplicity. The other parts of the image inverting optical system include a mirror and another prism.

It is to be noted in the present embodiment that at least one of the entrance and exit faces of such a prism may be formed with a refracting power such as that of a concave or convex curvature.

A field lens 7 is followed by a liquid crystal plate 6 serving as an information display member. The liquid crystal plate 6 takes its place at or near the first image forming plane 9, on which the objective lens system 10 forms the object image. A viewfinder field mask (not shown) is located in the first image plane 9 adjacent to the liquid crystal plate 6. An eyepiece lens 4 is used for observing the non-inverted erecting object image formed on the first image forming plane 9.

The objective lens system 10 comprises a negative first lens unit L1, a negative second lens unit L2 and a positive third lens unit L3. These three lens units are so arranged that the whole objective lens system 10 takes the retrofocus type. The predetermined back focal distance is thus secured, while still maintaining the increase of the angle of view to be achieved.

In the present invention, to obtain the predetermined zoom ratio, the first lens unit L1 remains stationary and the second lens unit L2 and the third lens unit L3 each move toward the object side, as shown by the arrows, when the magnification varies from the lowest magnification side to the highest magnification side. It is to be noted that the first lens unit L1 may otherwise be made movable during the variation of magnification.

The characteristic features of the invention lie in that, when the magnification is varied from the lowest magnification side to the highest magnification side, the second lens unit and the third lens unit move in such ways as follows:

(i) The second lens unit and the third lens unit each are made to move toward the object side mononically. Otherwise, the second lens unit would change its moving direction at a time during zooming. Thus, the object image is prevented from swaying at this turning point.

(ii) The separation between the first lens unit and the second lens unit is made to decrease monotonously. This assures simplification of the operating mechanism.

(iii) The separation between the second lens unit and the third lens unit becomes shortest at an intermediate magnification (at an intermediate zooming position). This makes a good compromise between the minimization of the total zooming movement of the third lens unit and the increase of the diameter of the axial exiting light beam in the region of higher magnifications, thus increasing the luminance of the viewfinder image to be observed.

According to the invention, the variable magnification viewfinder has such a zooming configuration as described above. Further, in its preferred embodiments, the invention sets forth additional rules of design for the objective lens system as follows:

(a) The aforesaid first, second and third lens units each are formed as a single lens, and the number "n" of aspheric surfaces included in the first, second and third lens units falls in the following range:

$$3 \leq n \leq 5 \qquad (1)$$

With these features or conditions satisfied, the entire lens system becomes simpler in structure and better in the compact form, while still permitting improvements of the viewfinder image for comfortable observation.

When the lower limit of the inequalities of condition (1) is exceeded, or two or less aspheric surfaces are used in the entirety of the objective lens system, it becomes difficult to realize a variable magnification viewfinder whose range of variation of the magnification is increased, whose maximum field angle is widened and whose objective lens system gives off the exiting light beam of increased diameter. When the upper limit is exceeded, the aberrations become easier to correct, but the assembling tolerance becomes more severe objectionably.

(b) The aforesaid third lens unit includes at least one lens of which both surfaces are aspheric, thereby correcting aberrations well throughout the entire zooming range, despite a reduction of the total number of lens elements in the variable magnification viewfinder.

(c) For the lowest magnification side, the separation B1W between the first lens unit and the second lens unit and the separation B2W between the second lens unit and the third lens unit satisfy the following condition:

$$0 < B2W/B1W < 2.6 \qquad (2)$$

This gives a good compromise between the assurance of the predetermined zoom ratio and the minimization of the size of the entire lens system. When the upper limit of the inequalities of condition (2) is exceeded, as this means that the second lens unit is too close to the first lens unit, the composite focal length of the first and second lens units increases in the negative direction, causing the total length of the entire lens system to increase greatly. When the lower limit is exceeded, the second and third lens units come to interfere with each other as zooming goes on.

It should be noted that within the scope of the invention, the upper limit of the condition (2) may be altered to "1.0". If so, more improved results are attained.

(d) The focal length f1 of the first lens unit satisfies the following condition:

$$0.5 < |f1|/fe < 1.30 \qquad (3)$$

where fe is the focal length of the eyepiece lens system. The inequalities of condition (3) have an aim chiefly to minimize the size of the entire lens system in such a manner that distortional aberration is corrected well. When the upper limit of the condition (3) is exceeded, as this means that the negative refractive power of the first lens unit is too weak, the distance the first lens unit axially moves when the eyesight and the parallax are adjusted by it, increases to increase the size of the entire lens system objectionably. When the negative refractive power of the first lens unit is beyond the upper limit, or too strong, this is advantageous at widening the maximum angle of field, but it becomes difficult to correct distortion well at the lower magnifications.

It is to be noted that it is more preferred to set the numerical range in the condition (3) as follows:

$$0.6 < |f1|/fe < 1.1 \qquad (3a)$$

(e) The first lens unit is constructed with a negative single lens of which both surfaces are concave, the second lens unit is constructed with a negative single lens having a concave surface facing the object side, and the third lens unit is constructed with a positive single lens of which both surfaces are convex, or with two positive lenses. By this arrangement, the size of the entire lens system is minimized and good optical performance is obtained throughout the entire zooming range.

(f) The second lens unit is constructed with a negative lens having a concave surface facing the object side. This simultaneously fulfills the requirements of increasing the back focal distance from the third lens unit to the first image forming plane and of widening the maximum angle of field.

In the invention, as an image inverting means, use is made of a Porro system or the like having four total reflections. Specifically speaking, the structure of construction which is found applicable are as follows:

(A) Reflection occurs twice in the prism 8. A first mirror is located in the space between the prism 8 and the field lens 7 to effect reflection for the third time. A second mirror located in the space between the liquid crystal plate 6 on the first image forming plane 9 and the eyepiece lens 4 reflects the light beam for the fourth time.

(B) The prism 8 reflects the light beam twice. By locating first and second mirrors in rear of the first image forming plane 9, the total number of reflections reaches four.

(C) The light beam is reflected once in the prism 8, and then from a first mirror for the second time. A second mirror and a third mirror are located in rear of the first image forming plane 9. Thus, four reflections occur in total.

(D) As a Porro system is in use, the light beam from the objective lens system 10 is reflected three times before it arrives at the first image forming plane 9. A prism or mirror is located in between the first image forming plane 9 and the eyepiece lens 4 to add one reflection, thus resulting in the total of four reflections.

Of course, the Porro system can take the following forms, too:

(E) Two reflections on the side of the objective lens system 10 and two reflections on the side of the eyepiece lens 4.

(F) One reflection on the side of the objective lens system 10 and three reflections on the side of the eyepiece lens 4.

(G) Four reflections on the side of the eyepiece lens 4.

It is also to be noted that the image inverting optical system may include an optical element having roofs of total reflections.

In the invention, for the constituent lenses, or first, second and third lenses, of the objective lens system, their materials may be acrylic resin in all. It is even preferable to use polycarbonate or like material of as high dispersion as the Abbe number vd is 35 or less in the negative lens of at least one of the first and second lens units. According to this, the longitudinal chromatic aberration can be lessened in the region of higher magnifications.

It is also recommended that a material of high refractive index such as polycarbonate of refractive index Nd=1.55 or higher is used in the negative lens of at least one of the first and second lens units. According to this, the curvatures of the lens surfaces can be loosened, so that the aberration correction is improved and the minimization of the size of the variable magnification viewfinder is facilitated.

Next, numerical examples 1 to 6 of the invention are shown. In the numerical data for the examples 1 to 6, Ri is the radius of curvature of the i-lens surface, when counted from the object side, Di is the i-th axial thickness or air separation, and Ni and vi are respectively the refractive index and Abbe number of the material of the i-th lens element.

The shape of the aspheric surface is expressed in the coordinates with an X axis in the axial direction and an H axis in the direction perpendicular to an optical axis, the direction in which light advances being taken as positive, by the following equation:

$$X = \frac{(1/R)H^2}{1+\sqrt{1-(H/R)^2}} + AH^2 + BH^4 + CH^6 + DH^8$$

where R is the radius of the osculating sphere, and A, B, C and D are the aspheric coefficients.

The values of the factors in the above-described conditions (2) and (3) for the numerical examples 1 to 6 are listed in Table-1. Notation "D–0X" means "×10$^{-x}$"

Numerical Example 1:

$\gamma = 0.331$–$1.086$   $\phi = 6.0$–$3.5$   $2\omega = 64.2°$–$19.6°$

| | | | |
|---|---|---|---|
| R 1 = ∞ | D 1 = 1.50 | N 1 = 1.49171 | v 1 = 57.4 |
| R 2 = ∞ | D 2 = 1.5 | | |
| R 3 = −19.72 | D 3 = 1.00 | N 2 = 1.49171 | v 2 = 57.4 |
| R 4 = 13.86 | D 4 = Variable | | |
| R 5 = −5.60 | D 5 = 1.00 | N 3 = 1.80518 | v 3 = 25.4 |
| R 6 = −10.05 | D 6 = Variable | | |
| R 7 = 13.09 | D 7 = 3.60 | N 4 = 1.49171 | v 4 = 57.4 |
| R 8 = −6.73 | D 8 = Variable | | |
| R 9 = ∞ | D 9 = 13.00 | N 5 = 1.57099 | v 5 = 50.8 |
| R10 = ∞ | D10 = 7.75 | | |
| R11 = 14.99 | D11 = 1.50 | N 6 = 1.50137 | v 6 = 56.4 |
| R12 = ∞ | D12 = 0.10 | | |
| R13 = ∞ | D13 = 0.55 | N 7 = 1.52300 | v 7 = 58.6 |
| R14 = ∞ | D14 = 0.55 | N 8 = 1.52300 | v 8 = 58.6 |
| R15 = ∞ | D15 = 15.75 | | |
| R16 = 16.81 | D16 = 3.00 | N 9 = 1.49171 | v 9 = 57.4 |
| R17 = −16.58 | | | |

| Variable | Magnification | | |
|---|---|---|---|
| Separation | 0.331 | 0.886 | 1.086 |
| D 4 | 12.73 | 5.13 | 2.18 |
| D 6 | 5.49 | 1.39 | 1.54 |
| D 8 | 0.50 | 12.20 | 15.01 |

Aspheric Coefficients:

| | B | C | D |
|---|---|---|---|
| R 3: | 2.849 D-04 | −1.229 D-06 | 0 |
| R 7: | −6.315 D-04 | −2.528 D-05 | 0 |
| R 8: | 2.626 D-04 | −1.108 D-05 | −3.270 D-07 |
| R17: | 1.200 D-04 | 0 | 0 |

Numerical Example 2:

$\gamma = 0.330$–$1.104$   $\phi = 6.0$–$3.5$   $2\omega = 63.6°$–$19.8°$

| | | | |
|---|---|---|---|
| R 1 = ∞ | D 1 = 1.50 | N 1 = 1.49171 | v 1 = 57.4 |
| R 2 = ∞ | D 2 = 1.5 | | |
| R 3 = −42.83 | D 3 = 1.00 | N 2 = 1.49171 | v 2 = 57.4 |
| R 4 = 11.96 | D 4 = Variable | | |
| R 5 = −5.76 | D 5 = 1.00 | N 3 = 1.80518 | v 3 = 25.4 |
| R 6 = −10.16 | D 6 = Variable | | |
| R 7 = 17.83 | D 7 = 3.68 | N 4 = 1.49171 | v 4 = 57.4 |
| R 8 = −6.47 | D 8 = Variable | | |
| R 9 = ∞ | D 9 = 12.60 | N 5 = 1.57099 | v 5 = 50.8 |
| R10 = ∞ | D10 = 7.75 | | |
| R11 = 14.99 | D11 = 1.50 | N 6 = 1.50137 | v 6 = 56.4 |
| R12 = ∞ | D12 = 0.10 | | |
| R13 = ∞ | D13 = 0.55 | N 7 = 1.52300 | v 7 = 58.6 |
| R14 = ∞ | D14 = 0.55 | N 8 = 1.52300 | v 8 = 58.6 |
| R15 = ∞ | D15 = 16.09 | | |
| R16 = 16.81 | D16 = 3.00 | N 9 = 1.49171 | v 9 = 57.4 |
| R17 = −16.58 | | | |

| Variable | Magnification | | |
|---|---|---|---|
| Separation | 0.330 | 0.625 | 1.104 |
| D 4 | 10.81 | 9.05 | 2.21 |
| D 6 | 7.81 | 2.57 | 1.64 |
| D 8 | 0.50 | 7.50 | 15.28 |

Aspheric Coefficients:

| | B | C | D |
|---|---|---|---|
| R 3: | 2.394 D-04 | −5.816 D-07 | 0 |
| R 7: | −7.112 D-04 | −5.413 D-05 | 0 |
| R 8: | 1.571 D-04 | −2.701 D-05 | −1.441 D-07 |
| R17: | 1.502 D-04 | −7.055 D-07 | 0 |

Numerical Example 3:

$\gamma = 0.324$–$1.053$   $\phi = 6.0$–$3.5$   $2\omega = 63.6°$–$20.0°$

| | | | |
|---|---|---|---|
| R 1 = ∞ | D 1 = 1.50 | N 1 = 1.49171 | v 1 = 57.4 |
| R 2 = ∞ | D 2 = 2.0 | | |
| R 3 = −20.28 | D 3 = 1.00 | N 2 = 1.49171 | v 2 = 57.4 |
| R 4 = 13.32 | D 4 = Variable | | |
| R 5 = −5.38 | D 5 = 1.00 | N 3 = 1.80518 | v 3 = 25.4 |
| R 6 = −14.75 | D 6 = Variable | | |
| R 7 = 9.50 | D 7 = 2.94 | N 4 = 1.49171 | v 4 = 57.4 |
| R 8 = −5.86 | D 8 = Variable | | |
| R 9 = ∞ | D 9 = 13.00 | N 5 = 1.49171 | v 5 = 57.4 |
| R10 = ∞ | D10 = 6.50 | | |
| R11 = 16.06 | D11 = 1.50 | N 6 = 1.49171 | v 6 = 57.4 |
| R12 = ∞ | D12 = 1.00 | | |
| R13 = ∞ | D13 = 0.4 | N 7 = 1.52300 | v 7 = 58.6 |
| R14 = ∞ | D14 = 0.55 | N 8 = 1.52300 | v 8 = 58.6 |
| R15 = ∞ | D15 = 15.79 | | |
| R16 = 16.80 | D16 = 3.00 | N 9 = 1.49171 | v 9 = 57.4 |
| R17 = −16.60 | | | |

| Variable | Magnification | | |
|---|---|---|---|
| Separation | 0.324 | 0.756 | 1.053 |
| D 4 | 14.97 | 6.86 | 2.36 |
| D 6 | 3.00 | 1.11 | 1.15 |
| D 8 | 0.68 | 10.68 | 15.13 |

-continued

Aspheric Coefficients:

|  | B | C |
|---|---|---|
| R 3: | 3.634 D-04 | −3.246 D-06 |
| R 7: | −8.634 D-04 | −1.369 D-05 |
| R 8: | 6.426 D-04 | −8.947 D-06 |
| R17: | 1.505 D-04 | −7.269 D-07 |

Numerical Example 4:

$\gamma = 0.323$–$1.049 \quad \phi = 7.3$–$3.8 \quad 2\omega = 63.6°$–$20.0°$

| R 1 = ∞ | D 1 = 1.50 | N 1 = 1.49171 | ν 1 = 57.4 |
| R 2 = ∞ | D 2 = 2.0 | | |
| R 3 = −14.66 | D 3 = 1.00 | N 2 = 1.49171 | ν 2 = 57.4 |
| R 4 = 19.34 | D 4 = Variable | | |
| R 5 = −6.26 | D 5 = 1.00 | N 3 = 1.80518 | ν 3 = 25.4 |
| R 6 = −11.73 | D 6 = Variable | | |
| R 7 = 12.18 | D 7 = 1.88 | N 4 = 1.49171 | ν 4 = 57.4 |
| R 8 = −6.91 | D 8 = Variable | | |
| R 9 = ∞ | D 9 = 13.60 | N 5 = 1.49171 | ν 5 = 57.4 |
| R10 = −17.74 | D10 = 7.80 | | |
| R11 = ∞ | D11 = 0.4 | N 6 = 1.52300 | ν 6 = 58.6 |
| R12 = ∞ | D12 = 0.40 | N 7 = 1.52300 | ν 7 = 58.6 |
| R13 = ∞ | D13 = 2.00 | | |
| R14 = ∞ | D14 = 12.40 | N 8 = 1.57090 | ν 8 = 33.8 |
| R15 = ∞ | D15 = 6.00 | | |
| R16 = 16.80 | D16 = 3.00 | N 9 = 1.49171 | ν 9 = 57.4 |
| R17 = −16.60 | | | |

| Variable Separation | Magnification | | |
|---|---|---|---|
| | 0.323 | 0.715 | 1.049 |
| D 4 | 16.13 | 8.61 | 2.62 |
| D 6 | 3.15 | 0.67 | 1.06 |
| D 8 | 0.50 | 10.50 | 16.10 |

Aspheric Coefficients:

|  | B | C |
|---|---|---|
| R 3: | 4.828 D-04 | −4.046 D-06 |
| R 7: | −5.205 D-04 | 9.352 D-07 |
| R 8: | 3.595 D-04 | −5.050 D-08 |
| R17: | 1.424 D-04 | −6.861 D-08 |

Numerical Example 5:

$\gamma = 0.324$–$1.056 \quad \phi = 5.9$–$3.5 \quad 2\omega = 63.6°$–$20.0°$

| R 1 = ∞ | D 1 = 1.50 | N 1 = 1.49171 | ν 1 = 57.4 |
| R 2 = ∞ | D 2 = 1.5 | | |
| R 3 = −22.54 | D 3 = 1.00 | N 2 = 1.49171 | ν 2 = 57.4 |
| R 4 = 13.22 | D 4 = Variable | | |
| R 5 = −5.82 | D 5 = 1.00 | N 3 = 1.80518 | ν 3 = 25.4 |
| R 6 = −13.75 | D 6 = Variable | | |
| R 7 = 13.36 | D 7 = 1.50 | N 4 = 1.49171 | ν 4 = 57.4 |
| R 8 = −38.61 | D 8 = 0.20 | | |
| R 9 = −132.15 | D 9 = 2.20 | N 5 = 1.49171 | ν 5 = 57.4 |
| R10 = −6.51 | D10 = Variable | | |
| R11 = −166.58 | D11 = 21.20 | N 6 = 1.49171 | ν 6 = 57.4 |
| R12 = −14.16 | D12 = 1.00 | | |
| R13 = ∞ | D13 = 0.15 | N 7 = 1.49171 | ν 7 = 57.4 |
| R14 = ∞ | D14 = 0.4 | N 8 = 1.52300 | ν 8 = 58.6 |
| R15 = ∞ | D15 = 0.40 | N 9 = 1.52300 | ν 9 = 58.6 |
| R16 = ∞ | D16 = 0.15 | N10 = 1.49171 | ν10 = 57.4 |
| R17 = ∞ | D17 = 16.12 | | |
| R18 = 12.80 | D18 = 3.00 | N11 = 1.49171 | ν11 = 57.4 |
| R19 = −24.22 | | | |

| Variable Separation | Magnification | | |
|---|---|---|---|
| | 0.324 | 0.784 | 1.056 |
| D 4 | 12.19 | 5.67 | 1.82 |
| D 6 | 5.23 | 1.76 | 1.68 |
| D10 | 2.46 | 12.46 | 16.38 |

Aspheric Coefficients:

|  | B | C |
|---|---|---|
| R 3: | 3.631 D-04 | −2.684 D-06 |
| R 7: | −9.115 D-04 | −3.392 D-05 |
| R 8: | 2.456 D-04 | −1.984 D-05 |
| R18: | −1.400 D-04 | |

Numerical Example 6:

$\gamma = 0.307$–$0.986 \quad \phi = 5.3$–$4.0 \quad 2\omega = 63.6°$–$19.6°$

| R 1 = ∞ | D 1 = 1.50 | N 1 = 1.49171 | ν 1 = 57.4 |
| R 2 = ∞ | D 2 = 1.5 | | |
| R 3 = −29.65 | D 3 = 1.00 | N 2 = 1.49171 | ν 2 = 57.4 |
| R 4 = 10.82 | D 4 = Variable | | |
| R 5 = −8.76 | D 5 = 1.00 | N 3 = 1.49171 | ν 3 = 57.4 |
| R 6 = −29.79 | D 6 = Variable | | |
| R 7 = 16.07 | D 7 = 1.80 | N 4 = 1.49171 | ν 4 = 57.4 |
| R 8 = −201.07 | D 8 = 0.20 | | |
| R 9 = 43.26 | D 9 = 1.80 | N 5 = 1.49171 | ν 5 = 57.4 |
| R10 = −7.46 | D10 = Variable | | |
| R11 = ∞ | D11 = 18.80 | N 6 = 1.49171 | ν 6 = 57.4 |
| R12 = ∞ | D12 = 0.25 | | |
| R13 = 10.09 | D13 = 2.50 | N 7 = 1.49171 | ν 7 = 57.4 |
| R14 = ∞ | D14 = 0.25 | | |
| R15 = ∞ | D15 = 0.15 | N 8 = 1.49171 | ν 7 = 57.4 |
| R16 = ∞ | D16 = 0.4 | N 9 = 1.52300 | ν 8 = 58.6 |
| R17 = ∞ | D17 = 0.40 | N10 = 1.52300 | ν 9 = 58.6 |
| R18 = ∞ | D18 = 0.15 | N11 = 1.49171 | ν10 = 57.4 |
| R19 = ∞ | D19 = 16.12 | | |
| R20 = 12.80 | D20 = 3.00 | N12 = 1.49171 | ν11 = 57.4 |
| R21 = −24.22 | | | |

| Variable Separation | Magnification | | |
|---|---|---|---|
| | 0.307 | 0.405 | 0.986 |
| D 4 | 8.91 | 10.05 | 2.39 |
| D 6 | 7.28 | 3.65 | 0.88 |
| D10 | 0.51 | 3.01 | 13.44 |

Aspheric Coefficients:

|  | B | C |
|---|---|---|
| R 3: | 2.802 D-04 | −2.223 D-06 |
| R 7: | −1.020 D-03 | −3.874 D-05 |
| R10: | −1.127 D-04 | −1.991 D-05 |
| R20: | −1.400 D-04 | |

TABLE 1

| Condition | Numerical Example | | | | | |
|---|---|---|---|---|---|---|
| Factor | 1 | 2 | 3 | 4 | 5 | 6 |
| B2W/B1W | 0.43 | 0.72 | 0.2 | 0.2 | 0.43 | 0.82 |
| \|f1\|/fe | 0.94 | 1.08 | 0.93 | 0.96 | 0.96 | 0.91 |

According to the invention, as described above, an objective lens system having a zoom section is appropriately designed to easily secure the predetermined zoom ratio, while still permitting minimization of the size of the entire lens system to be achieved. It is also made possible to achieve a wide-angle, large relative aperture variable magnification viewfinder of real image type capable of observing the viewfinder image with excellent quality.

What is claimed is:

1. A variable magnification viewfinder comprising, in order from an object side, an objective lens system, an image inverting optical system, and an eyepiece lens system, said objective lens system including, in order from an object side, a negative first lens unit, a negative second lens unit, and a positive third lens unit, wherein a real image formed by said objective lens system is observed through said eyepiece lens system after having been converted into an erecting image by said image inverting optical system, wherein during variation of magnification from a lowest magnification side to a highest magnification side, both said second lens unit and said third lens unit move toward the object side monotonically, wherein an air space between each of the adjacent lens units of said objective lens system changes along with variation of magnification, wherein each of said first lens unit, said second lens unit, and said third lens unit consists of a single lens, and wherein the following condition is satisfied:

$$3 \leq n \leq 5$$

where n represents the number of aspheric surfaces included in said first lens unit, said second lens unit, and said third lens unit.

2. A variable magnification viewfinder comprising, in order from an object side, an objective lens system, an image inverting optical system, and an eyepiece lens system, said objective lens system including, in order from an object side, a negative first lens unit, a negative second lens unit, and a positive third lens unit, wherein a real image formed by said objective lens system is observed through said eyepiece lens system after having been converted into an erecting image by said image inverting optical system, wherein during variation of magnification from a lowest magnification side to a highest magnification side, both said second lens unit and said third lens unit move toward the object side monotonically, and wherein an air space between said first lens unit and said second lens unit and an air space between said second lens unit and said third lens unit chance along with variation of magnification, said variable magnification viewfinder satisfying the condition of:

$$0.5 < |f1|/fe < 1.30$$

wherein f1 is a focal length of said first lens unit, and fe is a focal length of said eyepiece lens system.

3. A variable magnification viewfinder comprising, in order from an object side, an objective lens system, an image inverting optical system, and an eyepiece lens system, said objective lens system including, in order from an object side, a negative first lens unit, a negative second lens unit, and a positive third lens unit, wherein a real image formed by said objective lens system is observed through said eyepiece lens system after having been converted into an erecting image by said image inverting optical system, wherein during variation of magnification from a lowest magnification side to a highest magnification side, a separation between said first lens unit and said second lens unit decreases monotonically, wherein an air space between each of the adjacent lens units of said objective lens system changes along with variation of magnification, wherein each of said first lens unit, said second lens unit, and said third lens unit consists of a single lens, and wherein the following condition is satisfied:

$$3 \leq n \leq 5$$

where n represents the number of aspheric surfaces included in said first lens unit, said second lens unit, and said third lens unit.

4. A variable magnification viewfinder comprising, in order from an object side, an objective lens system, an image inverting optical system, and an eyepiece lens system, said objective lens system including, in order from an object side, a negative first lens unit, a negative second lens unit, and a positive third lens unit, wherein a real image formed by said objective lens system is observed through said eyepiece lens system after having been converted into an erecting image by said image inverting optical system, wherein during variation of magnification from a lowest magnification side to a highest magnification side, a separation between said first lens unit and said second lens unit decreases monotonically, and wherein an air space between said first lens unit and said second lens unit and an air space between said second lens unit and said third lens unit change along with variation of magnification, said variable magnification viewfinder satisfying the condition of:

$$0.5 < |f1|/fe < 1.30$$

wherein f1 is a focal length of said first lens unit, and fe is a focal length of said eyepiece lens system.

5. A variable magnification viewfinder according to claim 1, 2, 3, or 4, wherein a separation between said second lens unit and said third lens unit varies such that said second lens unit and said third lens unit are closest to each other at an intermediate magnification.

6. A variable magnification viewfinder according to claim 1 or 3, wherein both surfaces of said single lens of said third lens unit are aspheric.

7. A variable magnification viewfinder according to claim 1, 2, 3, or 4, satisfying the following condition:

$$0 < B2W/B1W < 2.6$$

where B1W and B2W are separations on the lowest magnification side between said first lens unit and said second lens unit and between said second lens unit and said third lens unit, respectively.

8. A variable magnification viewfinder according to claim 1, 2, 3, or 4, wherein said first lens unit remains stationary during variation of magnification.

9. A variable magnification viewfinder according to claim 2 or 4, wherein said third lens unit consists of a single lens, and wherein both surfaces of said single lens of said third lens unit are aspheric.

10. A variable magnification viewfinder according to claim 2, further satisfying the condition of:

$$0.6 < |f1|/fe < 1.1.$$

* * * * *

UNITED STATES PATENT AND TRADEMARK OFFICE
CERTIFICATE OF CORRECTION

PATENT NO. : 6,052,225
DATED : April 18, 2000
INVENTOR(S) : Koji Hoshi

It is certified that error appears in the above-identified patent and that said Letters Patent is hereby corrected as shown below:

Column 11,
Line 33, "chance" should read -- change --.

Signed and Sealed this

Twenty-fifth Day of September, 2001

Attest:

NICHOLAS P. GODICI
Attesting Officer    Acting Director of the United States Patent and Trademark Office